United States Patent [19]

Ochiai

[11] 3,943,390

[45] Mar. 9, 1976

[54] DECELERATION DETECTING DEVICE

[76] Inventor: Takeshi Ochiai, 7, Toyota-cho, Toyota, Aichi, Japan

[22] Filed: June 26, 1974

[21] Appl. No.: 483,383

[30] Foreign Application Priority Data

July 9, 1973 Japan.............................. 48-77221

[52] U.S. Cl................. 310/15; 310/30; 73/517 AV
[51] Int. Cl.² ..................................... H02K 35/06
[58] Field of Search ................. 310/15, 32, 29, 21; 73/517 R, 517 AV; 102/70.2, 70.2 GA; 335/277

[56] References Cited
UNITED STATES PATENTS

| 2,820,411 | 1/1958 | Park | 310/15 X |
| 3,153,735 | 10/1964 | Branagan et al. | 310/15 |
| 3,164,758 | 1/1965 | Siefert | 335/277 X |
| 3,768,832 | 10/1973 | Schmidt | 73/517 AV |

*Primary Examiner*—Donovan F. Duggan
*Attorney, Agent, or Firm*—Robert E. Burns; Emmanuel J. Lobato; Bruce L. Adams

[57] ABSTRACT

In a deceleration detecting device, magnetic induction electromotive force is utilized as a signal for expanding an air bag, and magnitude of this magnetic induction electromotive force is proportional to a speed variation ratio of a movable magnetic substance transferred by deceleration exceeding a predetermined value of a vehicle in order to decrease a detecting time.

3 Claims, 1 Drawing Figure

U.S. Patent March 9, 1976 3,943,390
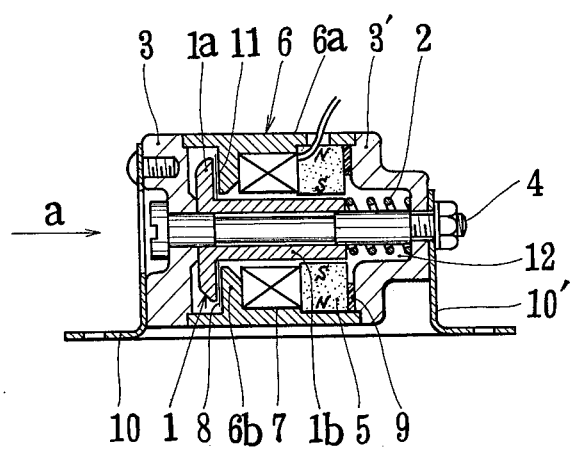

DECELERATION DETECTING DEVICE

BACKGROUND OF THE INVENTION

1. Field Of The Invention

The present invention relates to a detecting device for expanding an air bag upon collision of a vehicle so as to protect a driver safely before crash.

2. Description Of The Prior Art

As well known recently, apparatus have been developed that expand an air bag upon collision of a vehicle to prevent a driver from crashing on to a steering wheel, a front window, an instrument panel etc., thereby accidents resulting in loss of human life can be eliminated effectively.

In this case, a detecting time for expansion of an air bag is an important problem and influences and affects filling of an air bag, therefore slow action frequently cannot protect a driver safely.

Performance of a sensor of this sort in the prior art is that of a movable member transferred by deceleration produced at collision in no-brake condition or sudden brake action just before an obstacle is struck and the movable member contacts with an opposite contact member, thereby an electric circuit for acting an the air bag is closed to open a gas valve so that expanded gas is introduced into the air bag.

The above performance corresponds to an integral of a second order with respect to "deceleration" converted into "displacement."

SUMMARY OF THE INVENTION

In a deceleration detecting device in accordance with the invention a movable member is arranged at a prescribed position of a vehicle for controlling of expanding of an air bag and a valve for an air bag filling gas is operated by transfer of the movable member so as to protect a driver at the vehicle's collision. A magnetic path is provided which has a gap varying in the movable member transfer direction and includes the movable member coactive with a magnetic sensing element. The transfer speed of the movable member according to the deceleration produced upon vehicle collision can be detected early in the transferring state by means of the magnetic sensing element in order to decrease the detecting time.

OBJECTS OF THE INVENTION

An object of the present invention is the decrease of a detecting time for an air bag operation which performs effective expansion of the air bag to assure safety of a driver.

Another object of the present invention is that magnetic induction voltage is used as an electric signal for an air bag operation so as to decrease a detecting time.

A further object of the present invention is in that a movable member of magnetic material is transferred by means of deceleration of a vehicle and additionally acting magnetic attractive force wherein speed variation in the transferring state is converted to magnetic electromotive force which is proportional to the speed variation of the movable magnetic substance for shortening a detecting time.

Other objects and features of the invention will be apparent more fully from the following description taken in connection with the accompanying drawing.

BRIEF DESCRIPTION OF THE DRAWING

The sole FIGURE is a sectional view illustrating an embodiment of deceleration detecting device according to the invention.

DESCRIPTION OF THE PREFERRED EMBODIMENT

The drawing illustrates an embodiment of a detecting device (sensor) or sensing electromagnetic generator according to the invention.

The sensor is arranged at a suitable position in a vehicle, and supports 3, 3' of non-magnetic material are mounted respectively on two brackets 10, 10' which are rigidly secured holding a set distance with each other on a member of vehicle.

The two brackets 10, 10' are provided with holes for inserting a shaft 4 herein later described. One support 3 mounted on one bracket 10 is provided with a lateral recess for enclosing a head of the shaft 4, while the other support 3' has a hollow 12 and a bottom of the hollow 12 is provided with a hole for inserting therein the shaft 4.

Annular step portions are formed in opposite surfaces of the two supports 3, 3', between which a tube or outer sleeve 6 of magnetic material is supported, each step portion defining a corresponding step of the support. This outer sleeve is a casing for the device.

In an inner part of the magnetic tube 6 is formed inwardly extending flange 6b with a hole at its center.

At one side of the flange 6b, that is, at the side of the support 3' and within the magnetic tube 6, are enclosed a magnetic sensing element (an annular coil 7 in the illustrated embodiment) for controlling operating of a bag-filling action and an annular magnet 5 which is supported through a rubber bushing 9 attached to the support 3', thereby a fixed magnetic circuit is constituted.

A magnetic inner sleeve 1 extends through the center hole of the flange 6b, the annular coil 7 and the annular magnet 5. A stem or tubular portion 1b of the sleeve 1 is movable and supported slidably on a non-magnetic shaft 4 with an axial step portion inserted with the center hole of the sleeve and not contacting with the inner circumference and concentric with the hole. A flat head 1a of the movable magnetic sleeve 1 forms a gap 11 between the support 3 and the flange 6b, and a separator 8 of non-magnetic material is interposed within the gap 11.

A head of the shaft 4 is held in the recess formed outside of the support 3, while a threaded portion at another end of the shaft passes through the support 3' to a hole of the bracket 10' and is fastened by a nut from outside of 10'.

In the hollow 12 of the bracket 3' is enclosed a spring 2 which is inserted around the shaft 4 between an end surface of the movablve magnetic inner sleeve 1 and a bottom of the hollow 12 with a prescribed tension. The head 1a of the movable magnetic body or sleeve is usually pushed by the prescribed tension toward an inner surface of the support 3, thereby a necessary width of the gap 11 is maintained between the inner end surface of the head 1a and a surface of the flange 6b of the fixed magnetic substance.

In the drawing, the separator 8 prevents the head of the movable magnetic sleeve and the flange 6b from direct contacting at the working state described afterwards.

The annular magnet 5 has an S-pole the inner side and an N-pole at the outer side, thereby and magnetizes the magnetic tube 6 by means of magnetic lines of force passing through the center hole of the annular coil 7.

Magnetic flux passes through a magnetic path extending from the magnet 5 through the outer periphery 6a of the magnetic tube 6, gap 11, the movable magnetic sleeve 1 to the center hole of the annular coil 7.

The movable magnetic sleeve 1 is made of ferromagnetic material such as iron and the flange 6b attracts the head 1a of the movable magnetic sleeve 1, however, the magnetic attractive force induced at the gap 11 is weaker than the prescribed or preselected tension of the spring 2.

The annular coil 7 is electrically connected to a switch mechanism for controlling valve operation of the air bag (not shown), and in a normal state, that is, when the gap 11 is maintained, current does not flow in a coil, therefore the switch mechanism for the valve operation is an off condition.

In addition, diamagnetic material such as brass is used as a substance for the brackets 10, 10', the shaft 4 etc. while well-known ferromagnetic material such as iron, nickel, cobalt or alloy thereof is used for the movable magnetic sleeve 1 and the magnetic tube 6. Further, the separator 8 is made of diamagnetic material such as non-magnetic metal or plastics.

Now, operation of the present invention will be explained: In a normal drive state, the movable magnetic sleeve 1 is pushed an opposite direction, against the vehicle drive direction by the spring 12, thereby the gap 11 between the movable magnetic sleeve head 1a and the flange 6b is maintained at a required width.

When the vehicle collides in a no-brake state or a sudden brake action is performed just before colliding with an obstacle, vehicle speed decreases. When deceleration exceeds a prescribed value, the movable magnetic sleeve 1 compresses the spring 2 by means of inertia and transfers in a vehicle drive direction (arrow "a" direction), thereby the gap 11 between the movable magnetic sleeve head 1a and the flange 6b decreases.

Therefore the magnetic reluctance of the magnetic path decreases and flux passing through the annular coil 7 increases to produce an induction electromotive force in the coil. As magnetic reluctance is in inverse proportion to the square of width of the gap 11, the smaller the gap 11 the greater the flux variation.

Since magnetic attractive force is in inverse proportion to square of the distance, the decrease of the gap 11 strengthens the attractive force. Therefore the movable magnetic sleeve 1 is subjected to the deceleration of the vehicle (acceleration with respect to the movable magnetic sleeve 1) and in addition to acceleration due to the magnetic attractive force.

Magnetic induction electromotive force is proportional to flux variation, therefore the magnitude of the induced voltage changes are in proportion to speed variation of the movable magnetic substance per unit time. This induced voltage is used as a signal for the valve operation switch mechanism, and by opening the valve the air bag is filled with air and it expands instantaneously to protect a driver from a crash.

In the above embodiment, an annular coil is used as a magnetic sensing element. In order to use magnetic induction electromotive force as an electric signal, a Hall element and a magnetic diode etc. may be utilized with similar working effect.

Also instead of using a magnet a fixed magnetic substance side, a movable plumb may be a magnet in a similar principle.

Moreover, bellows made of elastic material such as rubber, or plastics may be used in place of a spring in a space between a movable magnetic substance and an inner flange of a magnetic tube.

The present invention which utilizes speed variation of a movable magnetic substance in a transferring state by means of vehicle deceleration and additionally acting magnetic attractive force, that is, a method of utilizing an integral value of a first order, has a fast detecting time and can expand an air bag effectively in comparison to a conventional system in which a movable magnetic substance is transferred and a contact member is contacted at an end point of transfer to obtain a signal for opening a valve of an air bag gas, that is a method of utilizing integral value of second order.

What I claim and desire by Letters Patent:

1. An acceleration sensing device for a vehicle comprising, a cylindrical casing of magnetic material having at one end thereof a radially inner shoulder, end closure caps secured to opposite ends of said casing and mounted on a stationary portion of the vehicle, an annular magnet arranged at the other end of said cylindrical casing, an annular induction coil disposed between said shoulder of the casing and said annular magnet, a bolt disposed through coaxial aligned openings of said shoulder and said coil, and said magnet to mutually secure said cylindrical casing and said end closure caps, a sleeve member of magnetic material slidably mounted on said bolt and provided with a radially outer flange which faces said shoulder of the casing, and a coil spring disposed between one of said end closure caps and one end of said slidable sleeve member to normally hold a predetermined clearance between said shoulder of the casing and said flange of the movable sleeve member.

2. An acceleration sensing electromagnetic generator comprising, an outer magnetic sleeve having a radially inwardly projecting annular flange with an aperture therethrough, an acceleration sensor comprising an inner magnetic sleeve extending axially through said aperture and having a head on one free end thereof, said head having a surface opposed to the annular sleeve and spaced therefrom defining an air gap therebetween, an elongated slide extending axially through said inner sleeve for guiding axial sliding travel of said inner sleeve thereon in a direction in which said head travels toward said annular flange in response to acceleration sensed thereby, a spring biasing said inner sleeve axially in a direction for maintaining said air gap corresponding to a direction opposite to a direction said inner sleeve travels in response to acceleration sensed thereby, a pickup coil in said outer magnetic sleeve about said inner sleeve and disposed in contact with said annular flange, an annular permanent magnet against said pick-up coil internally of said outer magnetic sleeve and circumferentially of said inner magnetic sleeve defining a magnetic circuit in conjunction with said outer and inner sleeves and providing lines of flux through said magnetic circuit and electromagnetically coupled to said pick-up coil, and mounting means mounting said slide, said inner sleeve and said outer sleeve coaxially in assembled relationship and providing means for securing thereof stationarily on a vehicle with said inner sleeve oriented for sensing deceleration of the vehicle, whereby said pick-up coil has a voltage induced therein upon decrease of said gap in response to acceleration of said inner sleeve upon deceleration of said vehicle.

3. An acceleration sensing electromagnetic generator according to claim 2, including a separator in said air gap made of a non-magnetic material for precluding said head from directly contacting said annular flange.

* * * * *